US012386429B2

(12) United States Patent
Agrawal et al.

(10) Patent No.: US 12,386,429 B2
(45) Date of Patent: Aug. 12, 2025

(54) TRIGGERING GESTURE EVENTS FOR USER-APPLIED FORCES ON A FLEXIBLE DISPLAY UNIT

(71) Applicant: MOTOROLA MOBILITY LLC, Wilmington, DE (US)

(72) Inventors: Amit Kumar Agrawal, Bangalore (IN); Amal Chandran, Basavanagudi (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/364,710

(22) Filed: Aug. 3, 2023

(65) Prior Publication Data

US 2025/0044876 A1 Feb. 6, 2025

(51) Int. Cl.
*G06F 3/01* (2006.01)
*G06F 3/14* (2006.01)
*H04M 1/02* (2006.01)

(52) U.S. Cl.
CPC ............ *G06F 3/017* (2013.01); *G06F 3/1454* (2013.01); *H04M 1/0237* (2013.01); *H04M 1/0268* (2013.01)

(58) Field of Classification Search
CPC .... G06F 3/017; G06F 3/1454; H04M 1/0237; H04M 1/0268
See application file for complete search history.

(56) References Cited

U.S. PATENT DOCUMENTS

| | | | |
|---|---|---|---|
| 11,184,987 B1* | 11/2021 | Jung | G01D 5/12 |
| 11,723,163 B1* | 8/2023 | Cavallaro | H04M 1/0237 |
| | | | 361/807 |
| 11,838,433 B1* | 12/2023 | Kumar Agrawal | H04M 1/0235 |
| 2001/0007449 A1* | 7/2001 | Kobachi | G06F 3/0421 |
| | | | 345/156 |
| 2014/0009419 A1* | 1/2014 | Kim | G06F 3/0412 |
| | | | 345/173 |
| 2014/0240178 A1* | 8/2014 | Chun | H01Q 1/243 |
| | | | 343/702 |
| 2019/0261519 A1* | 8/2019 | Park | G06F 1/1677 |
| 2020/0296199 A1* | 9/2020 | Shi | H04M 1/667 |
| 2021/0315113 A1* | 10/2021 | Wittenberg | H05K 5/0217 |
| 2022/0065660 A1* | 3/2022 | Kim | G06F 1/1624 |
| 2022/0417355 A1* | 12/2022 | Liu | G06F 1/1652 |

* cited by examiner

*Primary Examiner* — Ariel A Balaoing
(74) *Attorney, Agent, or Firm* — Isidore PLLC

(57) ABSTRACT

A method provides techniques for detecting, by a controller of an electronic device, where the electronic device comprises a device housing, a blade assembly carrying a blade and a flexible display and slidably coupled to the device housing, a translation mechanism operable to slide the blade assembly relative to the device housing to a plurality of positions between an extended position and a retracted position, and the controller communicatively coupled to the blade assembly and the translation mechanism, a force event acting on the translation mechanism. The method further includes detecting a force direction associated with the force event, and performing at least one action on the electronic device in response to detecting the force event and the associated force direction.

16 Claims, 10 Drawing Sheets

| USER FORCE | SCREEN MOTION | ACTION |
|---|---|---|
| Down | None | Action1 |
| Down | Down | Action2 |
| Down | Up | Action3 |
| Up | None | Action4 |
| Up | Down | Action5 |
| Up | Up | Action6 |
| Double Tap | None | Action7 |
| Double Tap | Down | Action8 |
| Double Tap | Up | Action9 |

FIG. 6A

| USER FORCE | FORCE LEVEL | ACTION |
|---|---|---|
| Down | Light | Action10 |
| Down | Medium | Action11 |
| Down | Hard | Action12 |

FIG. 6B

TRIGGERING GESTURE EVENTS FOR USER-APPLIED FORCES ON A FLEXIBLE DISPLAY UNIT

BACKGROUND

1. Technical Field

The present disclosure relates generally to portable electronic communication devices, and in particular to communication devices that have a single housing and a rollable flexible display that slides or translates.

2. Description of the Related Art

Smartphones have become an integral part of daily life, and provide a wide range of functionality. This functionality can include communication via voice calls, text messages, and/or other messaging applications (apps). Another important function of smartphones includes using multimedia applications. This use can include capturing photos and videos using onboard cameras, as well as listening to music and watching videos and movies. Other popular functions of smartphones include gaming, navigation, ecommerce, online banking, health and fitness tracking, and more. These are just a few examples, as smartphones offer a vast array of applications and functionalities that cater to various interests and needs.

Smartphones can provide notifications regarding various events, such as incoming messages, calls, emails, and social media updates. Smartphones enable real-time communication and help users stay connected with each other. Smartphone notifications can provide information updates for things such as news, weather, sports scores, stock market changes, and other important information. Additionally, these notifications can serve as reminders for important tasks, appointments, and events, including reminding users of upcoming meetings, birthdays, or deadlines, to ensure that users do not forget or miss anything important. Many applications (apps) send notifications to provide updates or inform a user about specific events. For example, a ride-sharing app might send notifications when a user's ride arrives, a food delivery app might notify a user about the status of his/her order, or a fitness app might remind a user to complete a daily exercise goal. While notifications provide valuable information and convenience, excessive or unnecessary notifications can also be distracting or overwhelming.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 6A depicts an exemplary data structure for implementation of various actions based on force events, according to one or more embodiments;

FIG. 6B depicts another exemplary data structure for implementation of various actions based on force events, according to one or more embodiments;

DETAILED DESCRIPTION

Figure 1:
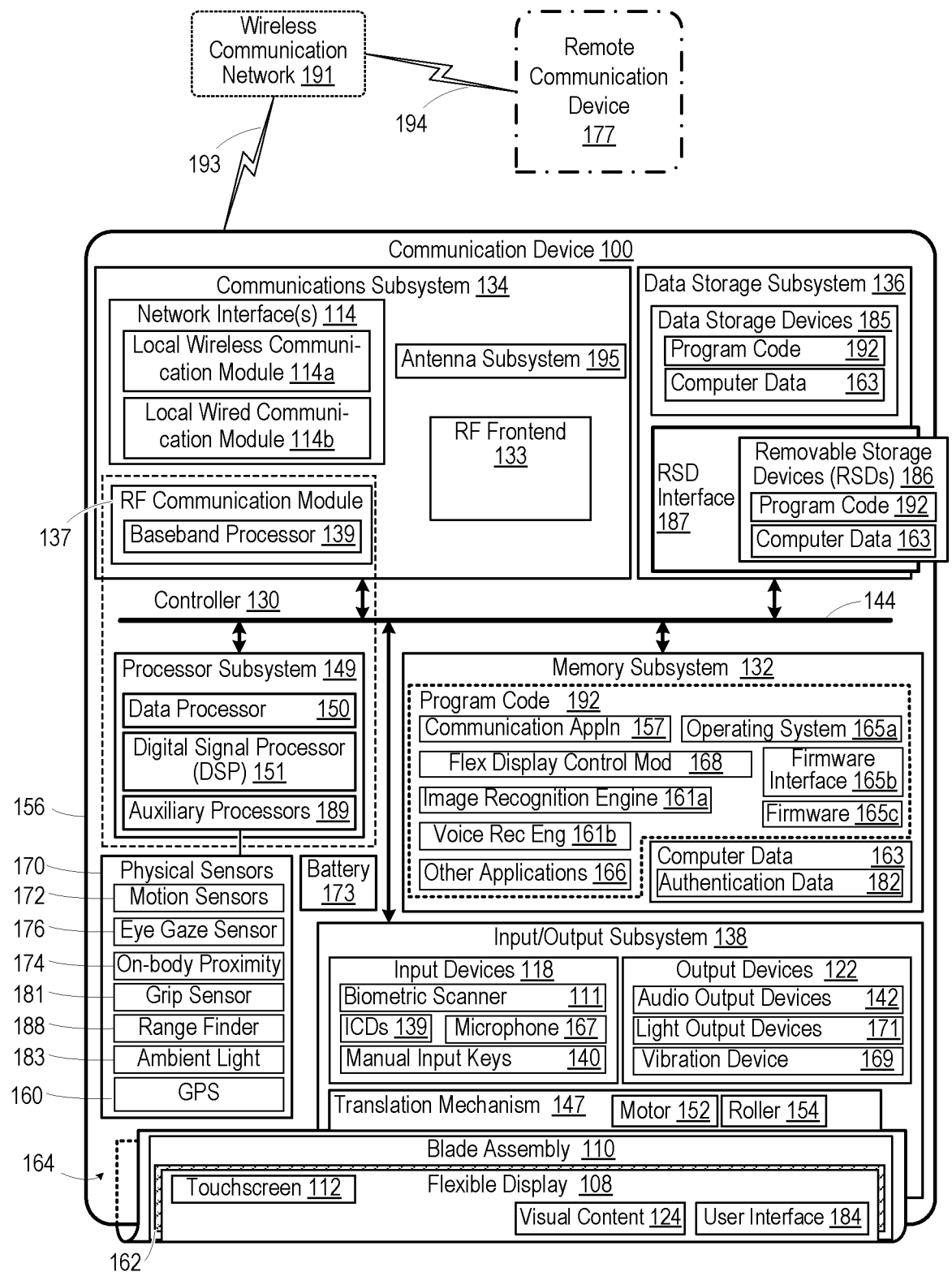
FIG. 1 is a functional block diagram of a communication device, according to one or more embodiments.

According to aspects of the present disclosure, an electronic device, a method, and a computer program product provides techniques for triggering gesture events for user-applied forces on a flexible display unit. The techniques allow a user to provide tactile interaction with a flexible display, enabling efficient response to incoming notifications, as well as providing a convenient way to invoke various features and functions of the electronic device. The method includes, detecting, by a controller of an electronic device, a force event acting on a translation mechanism of the electronic device, the electronic device comprising a device housing and a blade assembly carrying a blade and a flexible display and slidably coupled to the device housing. The translation mechanism is operable to slide the blade assembly relative to the device housing to a plurality of positions between an extended position and a retracted position. The controller is communicatively coupled to the blade assembly and the translation mechanism. The method further includes detecting a force direction associated with the force event and performing at least one action on the electronic device in response to detecting the force event and the associated force direction.

The present disclosure provides an effective technique for responding to notifications on an electronic device via interaction with a moveable display that includes a translation mechanism. The translation mechanism can include a motorized blade assembly that allows a flexible display to move, enabling more screen area when needed, and reducing the screen area when not needed or when it is desired to stow the device in a pocket or purse, for example. Disclosed embodiments enable interaction with one or more edges of the flexible display. A controller (processor) within the electronic device senses a force imparted on the flexible display by a user. In one or more embodiments, the level of force and/or direction of force are used to determine an action. The action can include, but is not limited to, responding to a notification, answering a call, declining a call, pausing media, silencing a ringer, and/or other types of actions. The actions can be predefined actions, user-defined actions, and/or application-specific actions that are performed on an actively running application on the electronic device.

Disclosed embodiments utilize a translation mechanism that moves a flexible display for detecting force events imparted on the display. In one or more embodiments, the translation mechanism may include one or more motors and/or positional encoders for determining an occurrence and/or direction of a force event. This enables users to interact with lateral and/or top edges of the flexible display. As an example, a user can pull up on the display, push down on the display, and/or double tap a top edge of the display, to indicate a gesture event. The gesture event can be associated with an action that is executed on the electronic device. The action can include responding to a notification. For example, the action can include silencing notifications, opening an application in response to receiving a notification, answering an incoming call, and so on. While examples described herein primarily refer to smartphones, disclosed embodiments may be applied to other portable electronic devices such as tablet computers, wearable computing devices, and/or other suitable computing devices.

In one or more embodiments, an electronic device is provided that includes: a device housing; a blade assembly carrying a blade and a flexible display and slidably coupled to the device housing; and a translation mechanism operable to slide the blade assembly in a plurality of positions relative to the device housing between an extended position and a retracted position. The translation mechanism includes a force sensor configured and disposed to detect external forces acting on the translation mechanism. The electronic device includes a controller communicatively coupled to the blade assembly and the translation mechanism, and which: detects a force event acting on the translation mechanism; detects a force direction associated with the force event; and performs at least one action on the electronic device in response to detecting the force event and the associated force direction.

In one or more embodiments, a method is provided. The method includes detecting, by a controller of an electronic device, a force event acting on a translation mechanism of the electronic device. The electronic device includes a device housing, a blade assembly carrying a blade and a flexible display and slidably coupled to the device housing, and the translation mechanism operable to slide the blade assembly relative to the device housing to a plurality of positions between an extended position and a retracted position. The electronic device also includes a controller communicatively coupled to the blade assembly and the translation mechanism. The method further includes: detecting a force direction associated with the force event; and performing at least one action on the electronic device in response to detecting the force event and the associated force direction.

In one or more embodiments, a computer program product is provided. The computer program product includes a non-transitory computer readable medium having program instructions that when executed by a processor of an electronic device that is configured according to the above described electronic device configures the electronic device to perform functions comprising: detecting a force event acting on the translation mechanism; detecting a force direction associated with the force event; and performing at least one action on the electronic device in response to detecting the force event and the associated force direction.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram depicting functional components of a communication device 100 within a communication environment 101 by which additional features, such as wireless communication, of the present disclosure are advantageously implemented. Communication device 100 can be one of a host of different types of devices, including but not limited to, a mobile cellular phone, satellite phone, or smart phone, a laptop, a netbook, an ultrabook, a wearable computing device, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

In one or more embodiments, functional components of communication device 100 include controller 130, memory subsystem 132, communications subsystem 134, data storage subsystem 136, and input/output (I/O) subsystem 138. I/O subsystem 138 includes I/O devices such as flexible display 108. According to aspects of the present disclosure, controller 130 is communicatively coupled to translation mechanism 147, which includes motor 152 and roller 154. Translation mechanism 147 is operable to slide blade assembly 110 relative to device housing 156 of communication device 100 between a retracted position as depicted at 158 and an at least partially extended position as depicted at 160. Blade assembly 110 carries blade 162, which is moved by roller 154, to position the flexible display 108 between a fully retracted position and an extended position, up to a fully extended position. Device housing 156 has front side 164 for viewing a portion of flexible display 108. According to aspects of the present disclosure, controller 130 is communicatively coupled to translation mechanism 150, which includes motor 152 and roller 154. Motor 152 may include a stepper motor, servo motor, and/or other suitable motor type. Translation mechanism 150 is operable to slide blade assembly 110 relative to device housing 156 of communication device 100 between a retracted position as depicted at 158 and an at least partially extended position as depicted at 160. Blade assembly 110 carries blade 162, which is moved by roller 154, to position the flexible display 108 between a fully retracted position and an extended position, up to a fully extended position. Translation mechanism 150 may include force sensor 157, which is configured and disposed to detect forces imparted on the blade assembly 110. In one or more embodiments, the force sensor 157 may comprise a positional encoder, such as a linear encoder. When a force is detected by blade assembly 110, the force can be interpreted as a force event. When the position is less than the expected position, the force event can be interpreted as a force event of a different direction than the motion direction of the blade assembly. When the position is greater than the expected position, the force event can be interpreted as a force event of a similar direction as the motion direction of the blade assembly. Additionally, when a change in position is detected while the blade assembly 110 is stationary, the force event can also be detected. Detecting two force events in rapid succession, (e.g., within 500 milliseconds) can be interpreted as a 'double tap'. Other force events are possible in disclosed embodiments. In one or more embodiments, the force sensor is further configured to detect a force level, and the controller, to perform the at least one action on the electronic device, selects the at least one action to perform, based at least in part, on the force level.

Referring now to the additional specific component makeup and the associated functionality of the presented components, system interlink 144 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. In one or more embodiments, internal battery 173 provides power for operation of the components within communication device 100. In one or more embodiments, internal battery 173 may be recharged via one or more interfaces provided by input/output subsystem 138, including, but not limited to, a wired charging interface such as a USB-C interface, and/or a wireless charging interface. Although certain direct interconnections (i.e., system interlink 144) are illustrated in FIG. 1, it is to be understood that more, fewer, or different interconnections may be present in other embodiments.

In one or more embodiments, communications subsystem 134 may include one or more network interfaces 114, such as local wireless communication module 114a and local wired communication module 114b, to communicatively couple communication device 100 respectively via wireless connection 193 to wireless communication network 191.

Communications subsystem 134 includes antenna subsystem 195. Communications subsystem 134 includes radio frequency (RF) frontend 133 and RF communication module 137 having baseband processor 139. RF frontend 133 includes transceiver(s), receiver(s), and/or modem(s), to facilitate communication between connected devices on various computer networks.

In one or more embodiments, controller 130, via communications subsystem 134, performs wireless communication with wireless communication network 191. Communications subsystem 134 can communicate with remote communication device 177 via wireless connection 194 to wireless communication network 191. In one or more embodiments, remote communication device 177 can include a smartphone, tablet computer, smartwatch, wearable computer, laptop computer, desktop computer, and so on. In one or more embodiments, communication device 100 utilizes one or more IEEE 802.11 WLAN protocols. In one or more embodiments, communications subsystem 134 receives information from satellites to obtain geospatial location information for processing by GPS module 160.

Controller 130 includes processor subsystem 149, which includes one or more central processing units (CPUs), depicted as data processor 150. Processor subsystem 149 can include one or more digital signal processors 151 that can be integrated with data processor 150. Processor subsystem 149 can include other processors that are communicatively coupled to data processor 150, such as baseband processors 139 of communication module 137. In another example, auxiliary processors 189 may act as a low power consumption, always-on sensor hub for physical sensors 170. In one or more embodiments that are not depicted, controller 130 can further include distributed processing and control components that are external to housing 156 or grouped with other components, such as I/O subsystem 138. Data processor 150 is communicatively coupled, via system interlink 144, to memory subsystem 132. In one or more embodiments, data processor 150 is communicatively coupled via system interlink 144 to communications subsystem 134, data storage subsystem 136 and I/O subsystem 138. Controller 130 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Memory subsystem 132 stores program code 192 for execution by processor subsystem 149 to provide the functionality described herein. Program code 192 includes applications such as communication application 157 that receives or generates visual content 124 on touchscreen 112 for implementations of user interface 184. Program code 192 can include various functions, including, but not limited to, flexible display control module 168 which may be software or firmware that detects force events imparted on blade assembly 110 and then executes an action based on the force event, in accordance with one or more embodiments. Program code 192 may include applications or utilities, such as image recognition engine 161a and voice recognition engine 161b, and other applications 166. In one or more embodiments, several of the described aspects of the present disclosure are provided via executable program code of applications executed by controller 130. In one or more embodiments, program code 192 may be integrated into a distinct chipset or hardware module as firmware that operates separately from executable program code. Portions of program code 192 may be incorporated into different hardware components that operate in a distributed or collaborative manner. Implementation of program code 192 may use any known mechanism or process for doing so using integrated hardware and/or software, as known by those skilled in the art. Program code 192 may access, use, generate, modify, store, or communicate computer data 163, such as authentication data 182. Computer data 163 may be organized in one of a number of different data structures. Common examples of computer data 163 include video, graphics, text, and images as discussed herein. Computer data 163 can also be in other forms of flat files, databases, and other data structures.

Memory subsystem 132 further includes operating system (OS) 165a, firmware interface 165b, such as basic input/output system (BIOS) or Uniform Extensible Firmware Interface (UEFI), and firmware 165c, which may be considered to be program code 192.

I/O subsystem 138 includes input devices 118, output devices 122, and I/O devices, such as flexible display 108. Flexible display 108 includes touchscreen 112 that operates as a user interface 184 of communication device 100. Blade assembly 110 includes blade 162 which supports flexible display 108. Input devices 118 may include biometric scanner 111, image capturing devices (ICDs) 139, manual input devices 140 (e.g., keys and buttons), microphone 167. In one or more embodiments, biometric scanner 111 can include a fingerprint scanner and/or a palmprint scanner. Output devices 122 may include audio output devices 142, light output devices 171, and vibration device 169.

Physical sensors 170 provides additional contextual indications of the use and environment of communication device 100. Examples of physical sensors 170 include motion sensors 172 which can include one or more motion detectors such as accelerometers that detect when communication device 100 is being moved by a user, or is stationary on a surface, such as table. Physical sensors 170 may include eye gaze sensor 176 that detects whether a user is looking toward communication device 100. Physical sensors 170 may include on-body proximity sensors 174 that detects proximity to a lossy dielectric mass (i.e., a hand or body of a user), such as when communication device 100 is placed in a pocket. Physical sensors 170 may include grip sensors 181 exteriorly presented on housing 156 detecting when communication device 100 is being held in a hand of a user. Physical sensors 170 may include range finder 188 and ambient light sensor 183.

Data storage subsystem 136 of communication device 100 includes data storage device(s) 185. Controller 130 is communicatively connected, via system interlink 144, to data storage device(s) 185. Data storage subsystem 136 provides program code 192 and computer data 163 stored on non-volatile storage that is accessible by controller 130. For example, data storage subsystem 136 can provide a selection of program code 192 and computer data 163. These applications can be loaded into memory subsystem 132 for execution/processing by controller 130. In one or more embodiments, data storage device(s) 185 can include hard disk drives (HDDs), optical disk drives, and/or solid-state drives (SSDs), etc. Data storage subsystem 136 of communication device 100 can include removable storage device(s) (RSD(s)) 186, which is received in RSD interface 187. Controller 130 is communicatively connected to RSD 186, via system interlink 144 and RSD interface 187. In one or more embodiments, RSD 186 is a non-transitory computer program product or computer readable storage device. Controller 130 can access data storage device(s) 185 or RSD 186 to provision communication device 100 with program code 192.

Figure 2A:
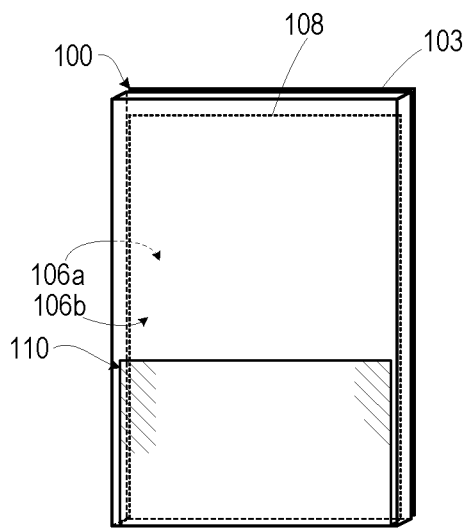
FIG. 2A depicts a back view of an example communication device having a translating blade assembly with flexible display moved to a fully retracted sliding position where the blade assembly wraps around a device housing of the communication device, according to one or more embodiments.
Figure 2C:
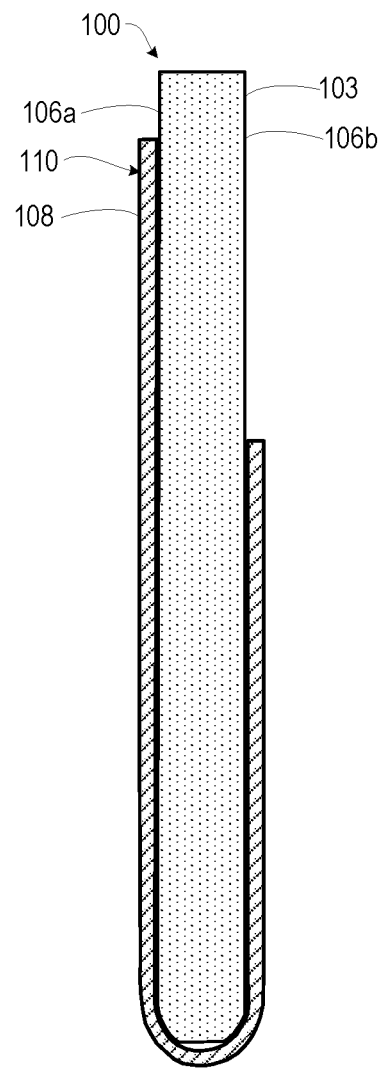
FIG. 2C depicts a side view of the example communication device of FIG. 2A with the front portion of the blade assembly not extending beyond the device housing, according to one or more embodiments.
Figure 2B:
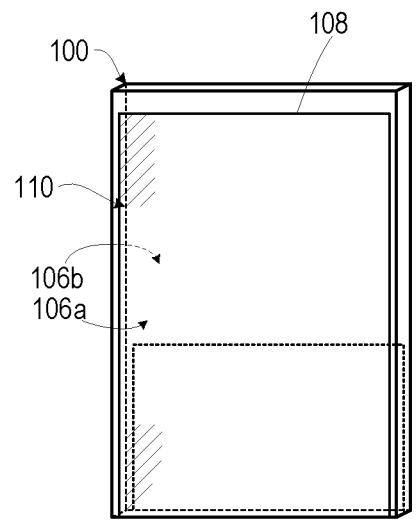
FIG. 2B depicts a front view of the example communication device of FIG. 2A with a front portion of the blade assembly not extending beyond the device housing, according to one or more embodiments.

FIG. 2A depicts a back view of an example communication device having a translating blade assembly with flexible display moved to a fully retracted sliding position where the blade assembly wraps around a back surface of the device housing of the communication device, according to one or more embodiments. FIG. 2B depicts a front view of the example communication device of FIG. 2A with a front portion of the blade assembly not extending beyond the device housing, according to one or more embodiments. FIG. 2C depicts a side view of the example communication device of FIG. 2A with the front portion of the blade assembly not extending beyond the device housing, according to one or more embodiments. With reference to FIGS. 1 and 2A-2C, when communication device 100 is in a retracted configuration, more of blade assembly 110, along with flexible display 108, rolls around one end of device housing 103, retracted onto back side 106b of device housing 103 so that an opposite end of blade assembly 110 does not extend beyond front side 106a of device housing 103.

Figure 3A:
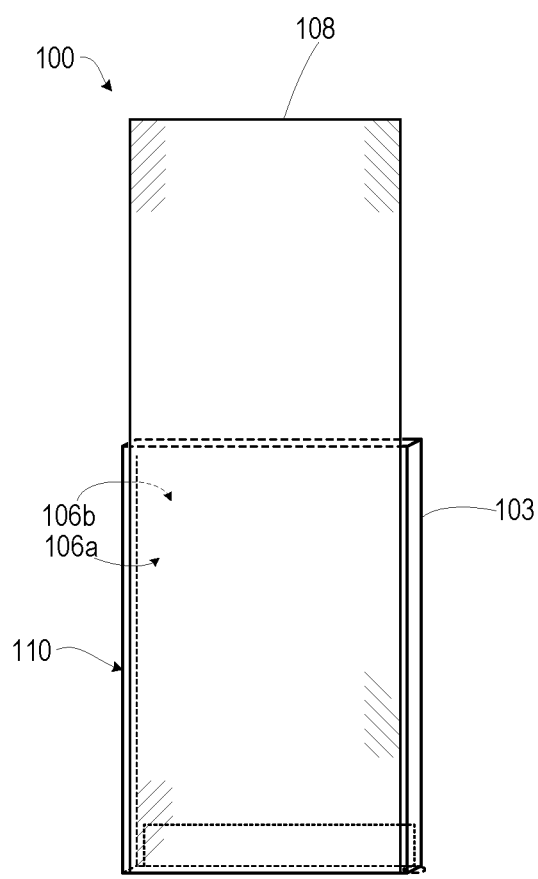
FIG. 3A depicts a front view of the example communication device having the translating blade assembly with the flexible display moved to the fully extended sliding position, where portions of the flexible display are fully extended distally away from a device housing of the communication device, according to one or more embodiments.
Figure 3B:
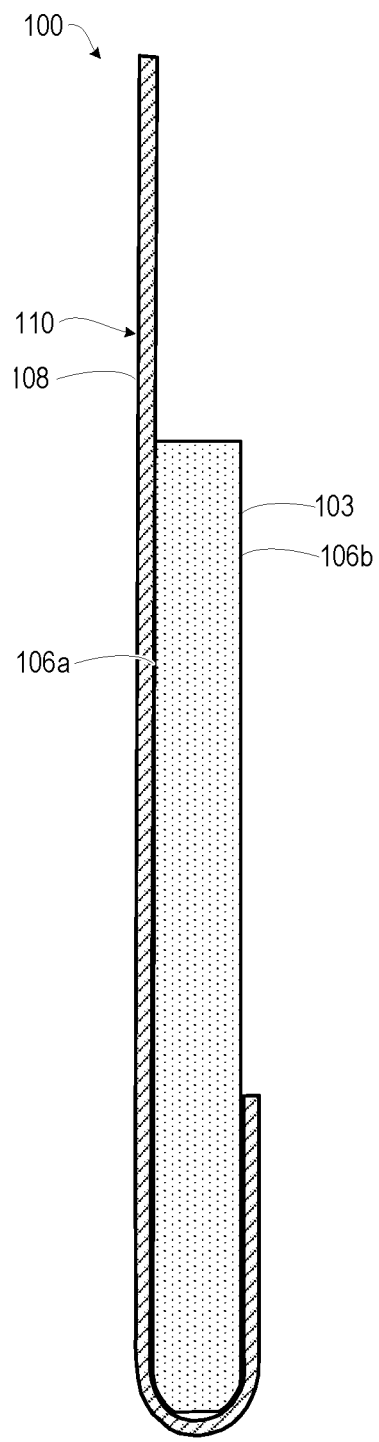
FIG. 3B depicts a side view of an example communication device of FIG. 3A with the front portion of the blade assembly extending beyond the device housing, according to one or more embodiments.

FIG. 3A is a front view of communication device 100 having blade assembly 110 moved to a fully extended sliding position. FIG. 3B depicts a left side view of communication device 100 of FIG. 3A. With reference to FIGS. 1 and 3A-3B, when communication device 100 is in an extended configuration, blade assembly 110 extends beyond an edge opposite to a rolling edge of front side 106a of device housing 103, increasing a display area of flexible display 108 on front side 106a. As depicted, blade assembly 110 extends upward.

Figure 4:
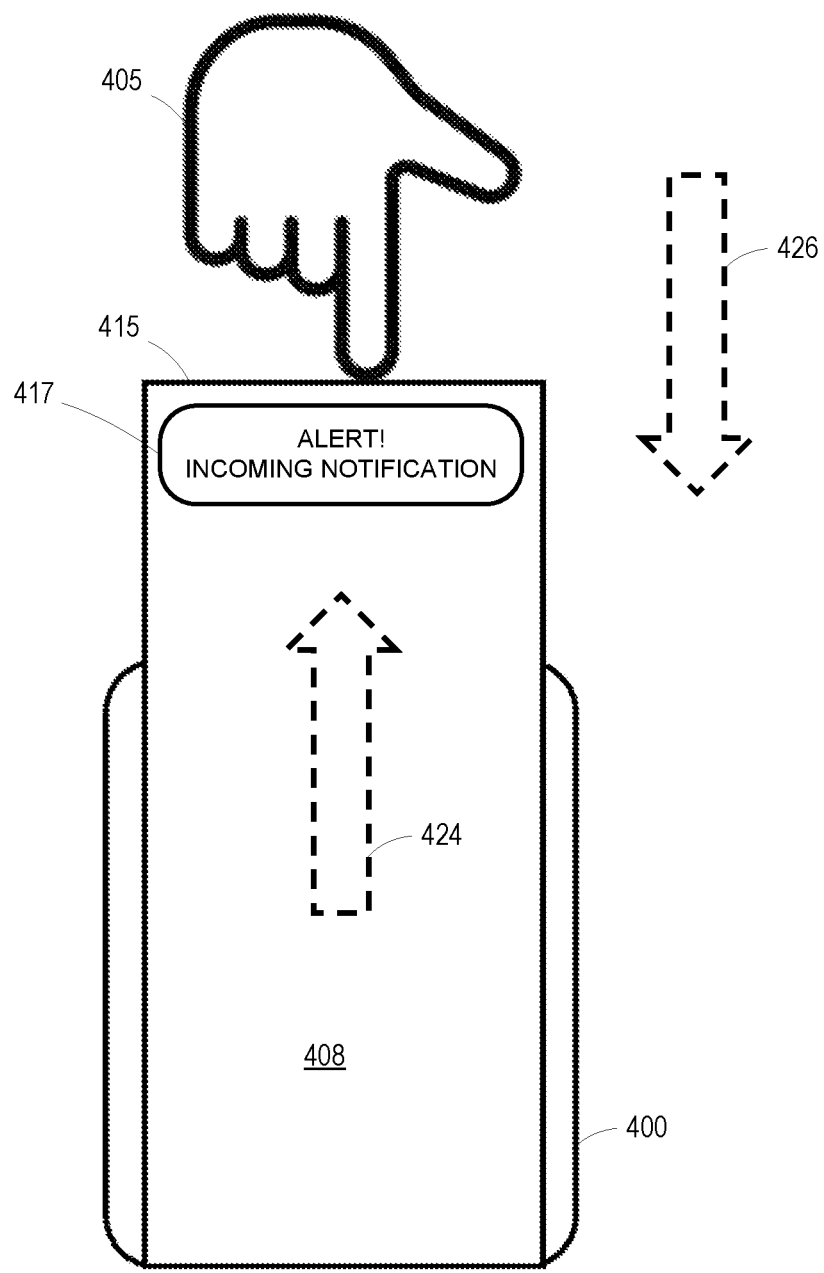
FIG. 4 depicts a front view of an example communication device detecting a force event with a direction different than the motion direction of the translation mechanism, according to one or more embodiments.

FIG. 4 depicts a front view of an example electronic device 400, according to one or more embodiments. Device 400 may be an implementation of communication device 100 (FIG. 1) having the same or similar components and providing the same or similar functions as communication device 100. Device 400 includes a flexible display 408, which may be similar to flexible display 108 of communication device 100 of FIG. 1. As shown in FIG. 4, the flexible display 408 is being extended (moved upward) by translation mechanism (not shown), as indicated by direction arrow 424. A user presses his/her finger(s) of hand 405 on the top edge 415 of the display 408, exerting force in the direction indicated by direction arrow 426. Thus, the direction of the force event (shown by arrow 426) and the motion direction of the display 408 (shown by arrow 424) are different and may be substantially opposite to each other. In response to detecting the force event caused by the hand 405 of a user pushing on the top edge 415 of the display 408, an action, such as clearing notification 417 or declining an incoming call, is triggered and performed. One additional advantage of the disclosed embodiments is that the hand 405 contacts edge 415 of the display 408, instead of the screen area, which reduces the amount of touching of the screen area, thereby serving to reduce fingerprints on the screen area, helping to keep the screen area cleaner.

Figure 5:
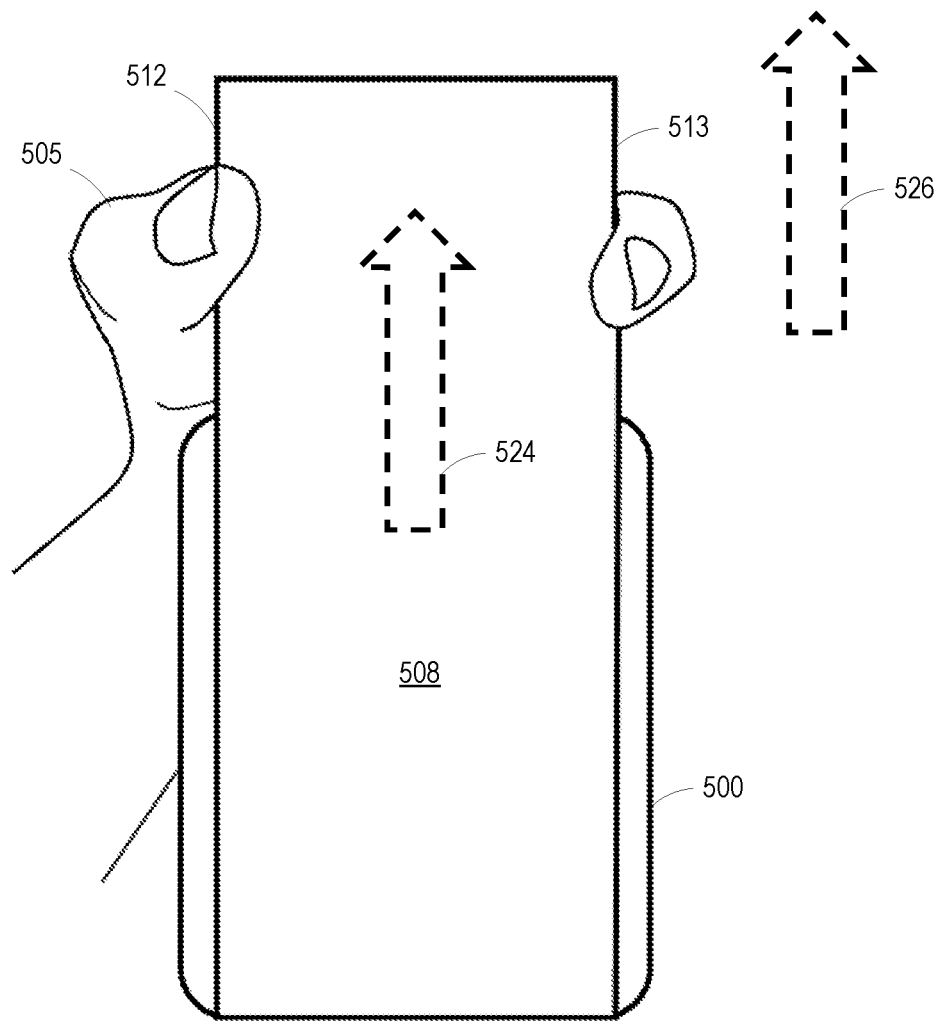
FIG. 5 depicts a front view of an example communication device detecting a force event with a direction similar to the motion direction of the translation mechanism, according to one or more embodiments.

FIG. 5 depicts a front view of an example electronic device 500 detecting a force event with a direction similar to the motion direction of the translation mechanism, according to one or more embodiments. Device 500 may be an implementation of communication device 100 (FIG. 1) having the same or similar components and providing the same or similar functions as communication device 100. Device 500 includes a flexible display 508, which may be similar to flexible display 108 of communication device 100 of FIG. 1. As shown in FIG. 5, the flexible display 508 is being extended (moved upward) as indicated by direction arrow 524. A user uses his/her hand 505 to grasp lateral edge 512 and lateral edge 513 and pulls upward, as indicated by direction arrow 526. In response to detecting the force event caused by the hand 505 of a user pulling the display 508, an action, such as opening a notification or answering an incoming call, can be performed. In one or more embodiments, the force sensor(s) 157 and/or blade assembly 110 (FIG. 1) are calibrated such that the force required to register a force event is relatively low, and as such a user simply provides a gentle push or a gentle pull in order to register a force event that results in an action being performed by the electronic device 500.

FIG. 6A depicts an exemplary data structure 600 for implementation of various actions based on force events, according to one or more embodiments. In one or more embodiments, the data structure 600 can be stored in memory subsystem 132 (FIG. 1), such that the controller 130 can access the user interface action data structure 600 and perform an action corresponding to a detected force event.

Data structure 600 includes column 621 which presents user-induced force events detected on the display of the electronic device, and an associated action for each of the user-induced force events. Additionally, column 622 presents an indication of a screen motion that is in progress when the force event was detected. Column 623 includes an assigned action to take, based on the user-induced force event and the screen motion that was occurring when the force event was detected. Rows 601-609 list nine possible actions, based on a user pushing down, pulling up, or double-tapping of an edge of the flexible display. While nine actions are shown in user interface action data structure 600, other embodiments may have more or fewer actions in the user interface action data structure. As an example, detecting a level of force (e.g., light, or hard) can enable more combinations, allowing for more actions to be included in the user interface action data structure 600, as indicated and described in further detail in FIG. 6B.

At row 601, the user-induced force is pressing down on the display (such as shown in FIG. 4), while the display is stationary, resulting in Action1 being performed. At row 602, the user-induced force is pressing down on the display (such as shown in FIG. 4), while the display is also moving down, resulting in Action2 being performed. At row 603, the user-induced force is pressing down on the display (such as shown in FIG. 4), while the display is moving up, resulting in Action3 being performed. At row 604, the user-induced force is pulling up on the display (such as shown in FIG. 5), while the display is stationary, resulting in Action4 being performed. At row 605, the user-induced force is pulling up on the display (such as shown in FIG. 5), while the display is moving down, resulting in Action5 being performed. At row 606, the user-induced force is pulling up on the display (such as shown in FIG. 5), while the display is also moving up, resulting in Action6 being performed. At row 607, two user-induced force events are detected within a predetermined time interval, and interpreted as a double tap, while the display is stationary, resulting in Action7 being performed. At row 608, two user-induced force events are detected within a predetermined time interval, and interpreted as a double tap, while the display is moving down, resulting in Action8 being performed. At row 609, two user-induced force events are detected within a predetermined time interval, and interpreted as a double tap, while the display is moving up, resulting in Action9 being performed.

The actions indicated in column 623 can include a variety of tasks and/or functions to be performed by the electronic device. The actions can include clearing a notification from the display. The actions can include silencing/declining an incoming call. The actions can include answering an incoming call. The actions can include taking a photograph and/or starting recording of video. The actions can include pausing, playing, and/or selection of media for playback. The media can include audio tracks and/or videos. The actions can include opening and/or closing of an application associated with an incoming notification. The actions can include application-specific actions, based on an application executing in the foreground of the electronic device. Other actions are possible in disclosed embodiments and within the general scope of the disclosure.

FIG. 6B depicts another exemplary data structure 650 for implementation of various actions based on force events, according to one or more embodiments. Data structure 650 includes column 661 which presents user-induced force events detected on the display of the electronic device, and an associated action for each of the user-induced force events. Additionally, column 662 presents a detected force level. Column 663 includes an assigned action to take, based on the user-induced force event and the detected force level. Rows 651, 652, and 653 list three possible actions, based on a light, medium, or hard force level applied to an edge of the flexible display. Although, unlike FIG. 6A, the presentation of data structure 650 does not include any positional or motion component of the display device, such that the display device can be assumed to be in any single one of the moving states when the force is detected; However, it is appreciated that alternate embodiments can account for differences in the resulting action for each of the three moving states presented within FIG. 6A. With these alternate embodiments, each moving state (up, down, stationary) would generate three different actions for a single tap force at different force levels. Also, in an extended embodiment that accounts for both single and double tap forces, the data structure would also include three additional different actions for a double tap (FIG. 6B).

In one or more embodiments, the data structure 650 can be stored in memory subsystem 132 (FIG. 1), such that the controller 130 can access the data structure 650 and perform an action corresponding to a detected force event, where the detected force event includes a force level. The resulting action taken is based, at least in part, on the force level. As an example, a light downward force can result in a first action, while a medium downward force can result in a second action, and a hard downward force can result in a third action. In one or more embodiments, a light downward force can be a force ranging from 1 Newton to 2 Newtons, a medium force can be a force ranging from 2.1 Newtons to 3 Newtons, and a hard force can be a force exceeding 3.1 Newtons. Other force ranges may be possible in disclosed embodiments. Accordingly, force level can be used as a criterion for determining an action.

Figure 7:
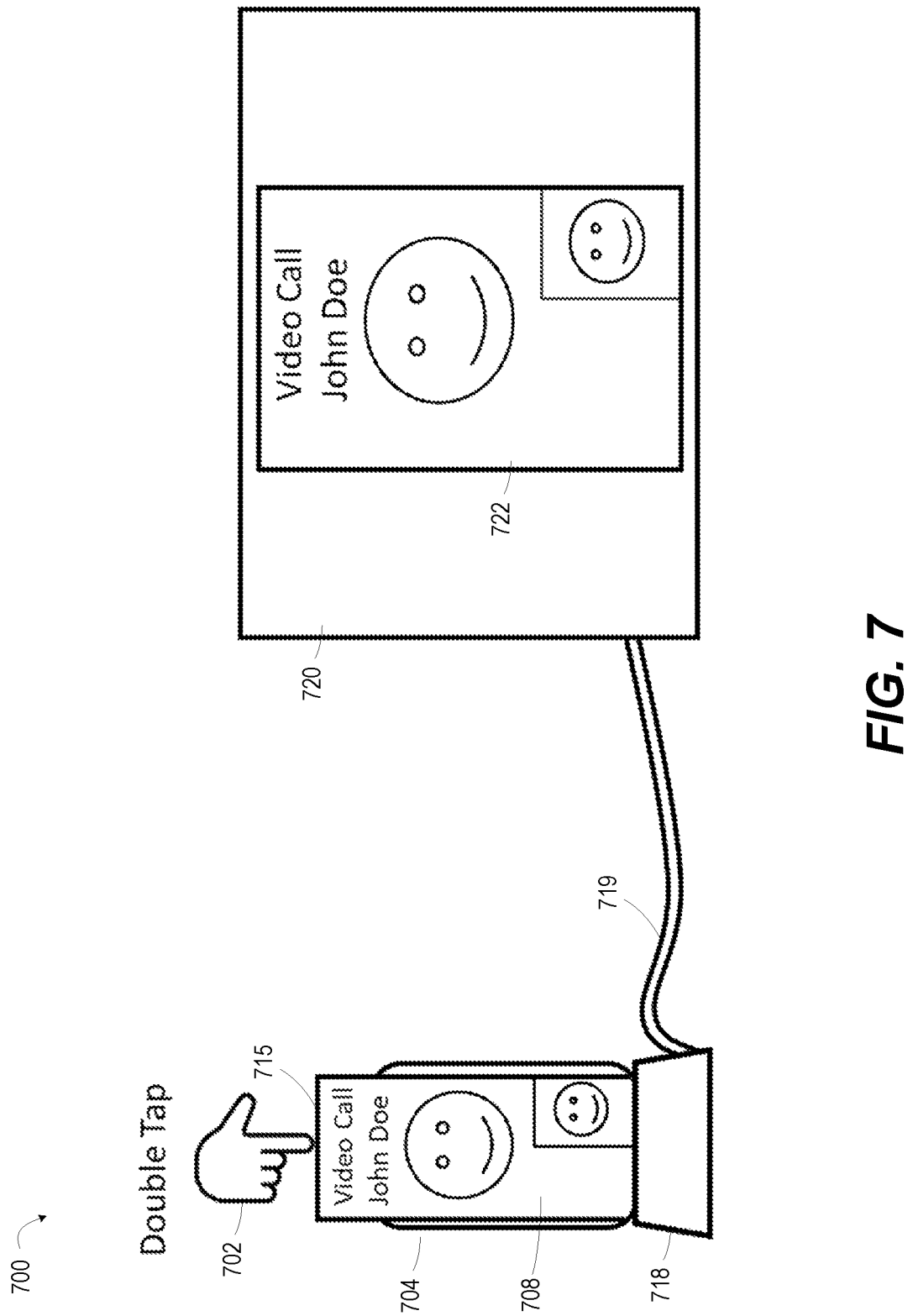
FIG. 7 illustrates an exemplary action of transmitting content to a second display based on force events, according to one or more embodiments.

FIG. 7 is a diagram 700 illustrating an exemplary action of presenting display content on a connected second display, based on detected force events, according to one or more embodiments. Device 704 may be an implementation of communication device 100 (FIG. 1) having the same or similar components and providing the same or similar functions as communication device 100. Device 704 includes a flexible display 708, which may be similar to flexible display 108 of communication device 100 of FIG. 1. In one or more embodiments, a user can perform a double-tap on a top edge 715 of a flexible display 708 of communication device 704 using his/her hand/fingers 702. The double-tap action can cause the controller within the communication device 704 to communicate with a remote device 720 to perform a screen mirroring or screen casting operation to show content from the communication device 704 as content 722 on remote device 720. Remote device 720 can include, but is not limited to, a laptop computer, a tablet computer, a smart television, and so on. In one or more embodiments, the communication device 704 may be inserted into a base (or dock) 718 that interfaces with wired communication module (e.g., 114b of FIG. 1) to provide a wired Ethernet connection 719 to the remote device 720. Alternatively, in one or more embodiments, the communication device 704 and the remote device 720 are connected via Wifi, Bluetooth, or other suitable communication technologies and/or protocols. Accordingly, in one or more embodiments, the communication device 704 performs an action based on detection of one or more force events incident upon a top edge 715 of the flexible display 708, causing a controller or processor within the communication device 704 to present display content on remote device 720. Other actions are possible in disclosed embodiments.

Figure 8:
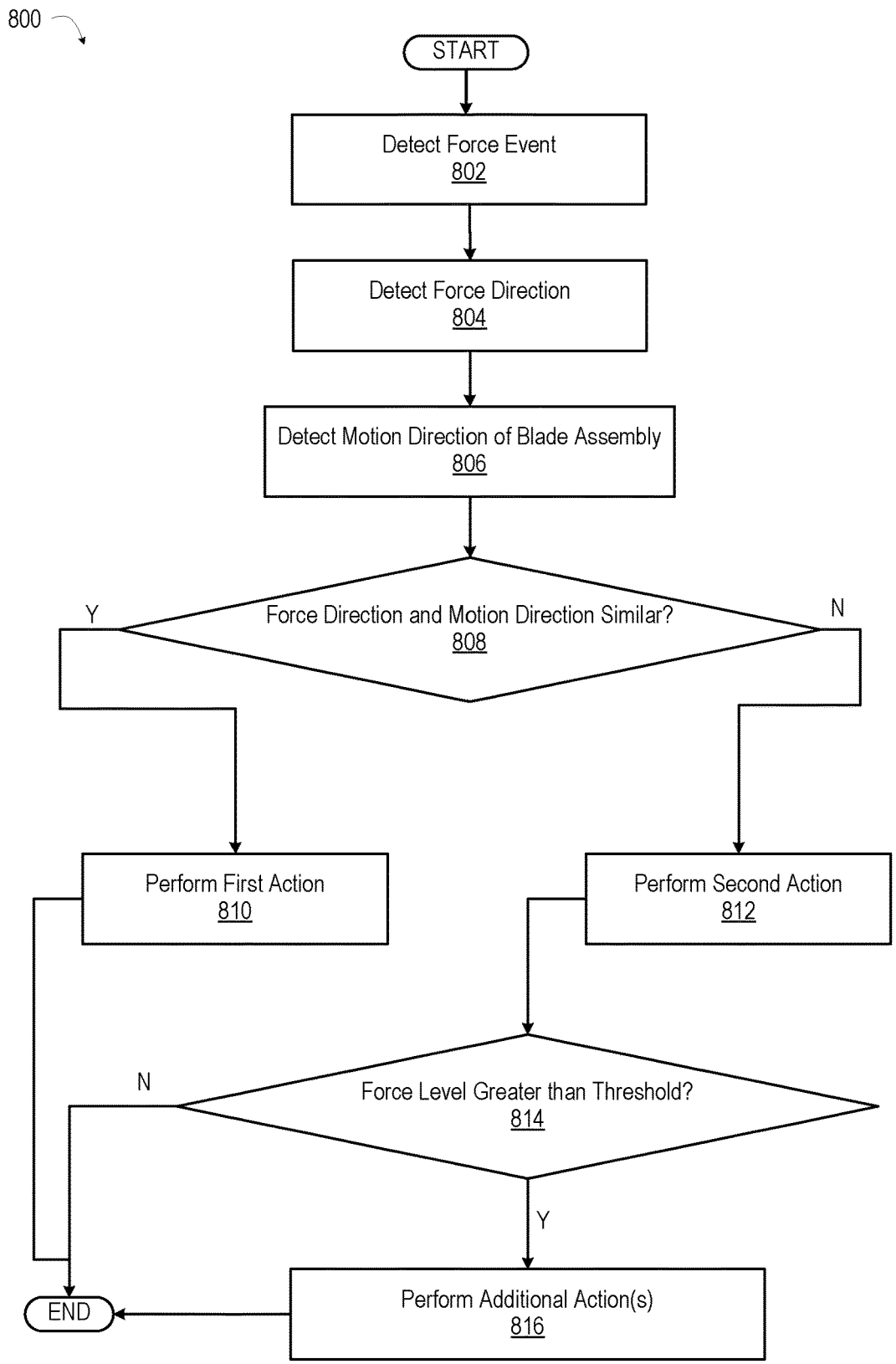
FIG. 8 is a flowchart presenting a method of triggering gesture events for user-applied forces on a flexible display unit, according to one or more embodiments.
Figure 9:
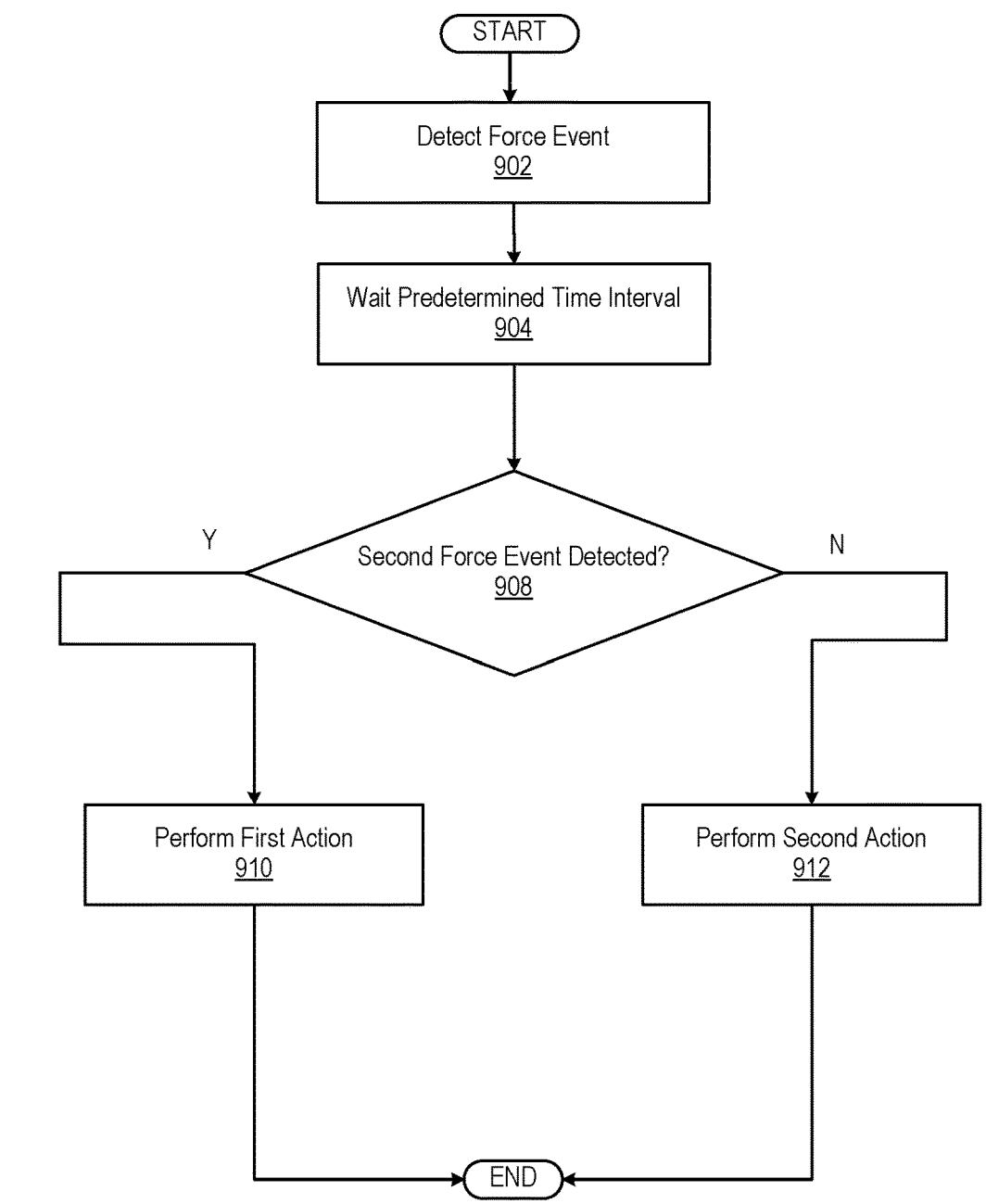
FIG. 9 is a flowchart presenting an additional method of triggering gesture events for user-applied forces on a flexible display unit, according to one or more embodiments

Referring now to the flow charts, FIG. 8 depicts a flowchart of a method 800 by which an electronic device enables triggering gesture events for user-applied forces on a flexible display unit, according to one or more embodiments. FIG. 9 depicts a flowchart of a method 900 by which an electronic device enables additional embodiments of triggering gesture events for user-applied forces on a flexible display unit, according to one or more embodiments. The descriptions of methods in FIGS. 8-9 are provided with general reference to the specific components illustrated within the preceding FIGS. 1-7. Specific components referenced in FIGS. 8-9 may be identical or similar to components of the same name used in describing preceding FIGS. 1-7. In one or more embodiments, controller 130 (FIG. 1) configures communication device 100 (FIG. 1) to provide the described functionality of the methods depicted in FIGS. 8-9 by executing program code for one or more modules or applications provided within memory subsystem 132 of communication device 100.

FIG. 8 is a flow diagram presenting a method 800 of triggering gesture events for user-applied forces on a flexible display unit, according to one or more embodiments. The method 800 begins at block 802 where a force event is detected. The method 800 continues to block 804 where a direction of the force event is detected. The method 800 then continues to block 806 where the motion direction of the blade assembly is detected.

The method 800 then continues to block 808 where a determination is made of whether the force direction and motion direction are similar. If, at block 808, it is determined that the force direction and motion direction are similar (such as depicted in FIG. 5), then the method continues to block 810, where a first action is performed, and the method 800 then ends. If, at block 808, it is determined that the force direction and motion direction are not similar (such as depicted in FIG. 4), then the method continues to block 812, where a second action is performed. The second action can include removing a notification from the flexible display. One or more embodiments can include presenting a notification on the flexible display, comparing the force level with a predetermined threshold, and removing the notification from the flexible display in response to determining that the force level is at or below a predetermined force threshold.

In one or more embodiments, after executing block 812, the method 800 continues to block 814, where a determination is made of whether the force level is greater than a predetermined threshold. If, at block 814, the force level is determined to be less than or equal to the threshold, then the method 800 ends. If, at block 814, the force level is determined to be greater than the threshold, then the method 800 continues to block 816, where one or more additional actions are performed. In one example use case, when a user presses lightly on the display such that the threshold in block 814 is not exceeded, a notification is cleared, based on the action performed at block 812. When a user presses harder on the display such that the threshold in block 814 is exceeded, a notification is cleared, based on the action performed at block 812, and the additional action(s) of block 816 are also performed, which can include snoozing incoming notifications for a predetermined duration (e.g., 30 minutes), and/or reversing a motion direction of the blade assembly, as examples.

In one or more embodiments, the controller: detects a motion direction of the blade assembly; and performs a first action in response to detecting that the force direction and the motion direction are similar. In one or more embodiments, the controller: performs a second action in response to detecting that the force direction and the motion direction are different. In one or more embodiments, the controller presents a notification on the flexible display, and the at least one action includes removal of the notification from the flexible display in response to determining that the force level is at or below a predetermined force threshold. In one or more embodiments, the controller removes the notification from the flexible display and suppresses future notifications from the flexible display for a predetermined time interval. In one or more embodiments, in response to determining that the force level is at or above a predetermined force threshold, the controller reverses the motion direction of the blade assembly. Other actions can be performed in response to detection of force events, in one or more embodiments.

FIG. 9 is a flow diagram presenting a method 900 by which an electronic device enables additional embodiments of triggering gesture events for user-applied forces on a flexible display unit, according to one or more embodiments. In particular, the method 900 illustrates detection and processing of 'double tap' user-applied forces. Method 900 starts by detecting a force event at block 902. Method 900 continues to block 904, where the method 900 waits for a preset/predetermined time interval (e.g., 500 milliseconds). In one or more embodiments, controller activates a timer at the time a first force event that is identified as a tap event is detected. The timer runs for a set period of time and resets on expiration of that period or on detection of another force event before the expiration of the timer. Method 900 continues to block 908, where a determination is made of whether a second force event is detected during the predetermined time interval of block 904. If, at block 908, a second force event was detected before expiration of the timer or within the preset/predetermined time interval, then the method 900 continues to block 910, where a 'double tap' gesture is registered and a corresponding first action is performed. The first action performed at 910 is associated with a 'double tap' gesture. If, at block 908, a second event is not detected, then the method continues to block 912, where a second action is performed. The second action is not associated with a 'double tap' gesture. After execution of block 912, the method 800 ends.

In one or more embodiments, one or more of the actions associated with the blocks depicted in the flowcharts may be performed in a different order, and/or performed concurrently. In one or more embodiments, the electronic device is configured to detect a second force event, determine a time interval between the force event and the second force event, and perform at least one action on the electronic device in response to determining that the time interval is less than a predetermined time interval.

As can now be appreciated, disclosed embodiments provide an additional level of user interaction for electronic devices that have moveable, 'scrollable' displays. Disclosed embodiments enable use of a 'push' action on a moveable display to negate an action such as declining an incoming call or dismissing an active notification. Additionally, a 'double tap' gesture can be detected and associated with an action, such as transferring display of content from the electronic device (e.g., such as depicted in FIG. 7), which can include a nearby laptop computer. Embodiments can include a communication subsystem that communicatively connects the electronic device to one or more second devices via a network, Bluetooth connection, or other suitable connection mechanism, where to perform the at least one action, the controller: selects content for consumption at a second device communicatively coupled to the electronic device; and in response to the second force event, transmits a command to the second device, the command including instructions that cause the second device to display the content that was selected for consumption at the second device. A wide variety of other user interactions are made possible by disclosed embodiments, thereby enhancing the user experience for electronic devices that include a moveable, scrollable, electronic display.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
a device housing;
a blade assembly carrying a blade and a flexible display and slidably coupled to the device housing;
a translation mechanism operable to slide the blade assembly in a plurality of positions relative to the device housing between an extended position and a retracted position, wherein the translation mechanism includes a force sensor, the force sensor configured and disposed to detect a direction and a force level of external forces acting on the translation mechanism; and
a controller communicatively coupled to the blade assembly and the translation mechanism, and which:
detects a force event acting on the translation mechanism;
detects a force direction associated with the force event; and
detects a motion direction of the blade assembly;
performs at least one action on the electronic device in response to detecting the force event and the associated force direction and the motion direction of the blade assembly relative to the force direction, wherein the controller: performs a first action in response to detecting that the force direction and the motion direction are similar; and performs a second action in response to detecting that the force direction and the motion direction are different.

2. The electronic device of claim 1, wherein the force sensor is further configured to detect a force level, and wherein the controller, to perform the at least one action on the electronic device, selects the at least one action to perform, based at least in part, on the force level.

3. The electronic device of claim 2, wherein further, in response to determining that the force level is at or above a predetermined force threshold, the controller reverses the motion direction of the blade assembly.

4. The electronic device of claim 1, wherein the controller:
detects a second force event;
determines a time interval between the force event and the second force event; and
performs at least one action on the electronic device in response to determining that the time interval is less than a predetermined time interval.

5. The electronic device of claim 2, wherein:
the controller presents a notification on the flexible display; and
the at least one action comprises removal of the notification from the flexible display in response to determining that the force level is at or below a predetermined force threshold.

6. The electronic device of claim 5, wherein, in response to determining that the force level is greater than the predetermined force threshold, the controller removes the notification from the flexible display and suppresses future notifications from the flexible display for a predetermined time interval.

7. The electronic device of claim 4, further comprising:
a communication subsystem that communicatively connects the electronic device to one or more second devices via a network, wherein to perform the at least one action, the controller:
selects content for consumption at a second device communicatively coupled to the electronic device; and
in response to the second force event, transmits a command to the second device, the command including instructions that cause the second device to display the content that was selected for consumption at the second device.

8. A method comprising:
detecting, by a controller of an electronic device, a force event acting on a translation mechanism of the electronic device, the electronic device comprising a device housing, a blade assembly carrying a blade and a flexible display and slidably coupled to the device housing, the translation mechanism operable to slide the blade assembly relative to the device housing to a plurality of positions between an extended position and a retracted position, and the controller communicatively coupled to the blade assembly and the translation mechanism;
detecting a force direction associated with the force event;
detecting a motion direction of the blade assembly; and
performing at least one action on the electronic device in response to detecting the force event and the associated force direction and the motion direction of the blade assembly relative to the force direction, wherein performing the at least one action comprises: performing a first action in response to detecting that the force direction and the motion direction are similar; and
performing a second action in response to detecting that the force direction and the motion direction are different.

9. The method of claim 8, further comprising:
detecting a force level; and
selecting the at least one action to perform, based at least in part, on the force level.

10. The method of claim 9, further comprising, reversing the motion direction of the blade assembly in response to determining that the force level is at or above a predetermined force threshold.

11. The method of claim 8, further comprising:
detecting a second force event;
determining a time interval between the force event and the second force event; and
performing at least one action on the electronic device in response to determining that the time interval is less than a predetermined time interval.

12. The method of claim 9, further comprising:
presenting a notification on the flexible display;
comparing the force level with a predetermined threshold; and
removing the notification from the flexible display in response to determining that the force level is at or below a predetermined force threshold.

13. The method of claim 12, further comprising, in response to determining that the force level is greater than the predetermined force threshold:
removing the notification from the flexible display; and
suppressing future notifications from the flexible display for a predetermined time interval.

14. The method of claim 11, further comprising:
selecting content for consumption at a second device communicatively coupled to the electronic device; and
in response to the second force event, transmitting a command to the second device, the command including instructions that cause the second device to display the content that was selected for consumption at the second device.

15. A computer program product comprising a non-transitory computer readable medium having program instructions that when executed by a processor of an electronic device that comprises a device housing, a blade assembly carrying a blade and a flexible display and slidably coupled to the device housing, a translation mechanism operable to slide the blade assembly in a plurality of positions relative to the device housing between an extended position and a retracted position, and a controller communicatively coupled to the blade assembly and the translation mechanism, the program instructions configure the electronic device to perform functions comprising:
detecting a force event acting on the translation mechanism;
detecting a force direction associated with the force event;
detecting a motion direction of the blade assembly; and
performing at least one action on the electronic device in response to detecting the force event, the associated force direction, and the motion direction of the blade assembly relative to the force direction, wherein performing the at least one action comprises: performing a first action in response to detecting that the force direction and the motion direction are similar; and performing a second action in response to detecting that the force direction and the motion direction are different.

16. The computer program product of claim 15, wherein the computer program product further comprises program instructions for:
   detecting a force level; and
   selecting the at least one action to perform, based at least in part, on the force level.

* * * * *